Aug. 16, 1938.   G. WÜNSCH ET AL   2,126,855
DIRECTION MAINTAINING MEANS FOR USE ON DIRIGIBLE CRAFT
Filed July 29, 1936
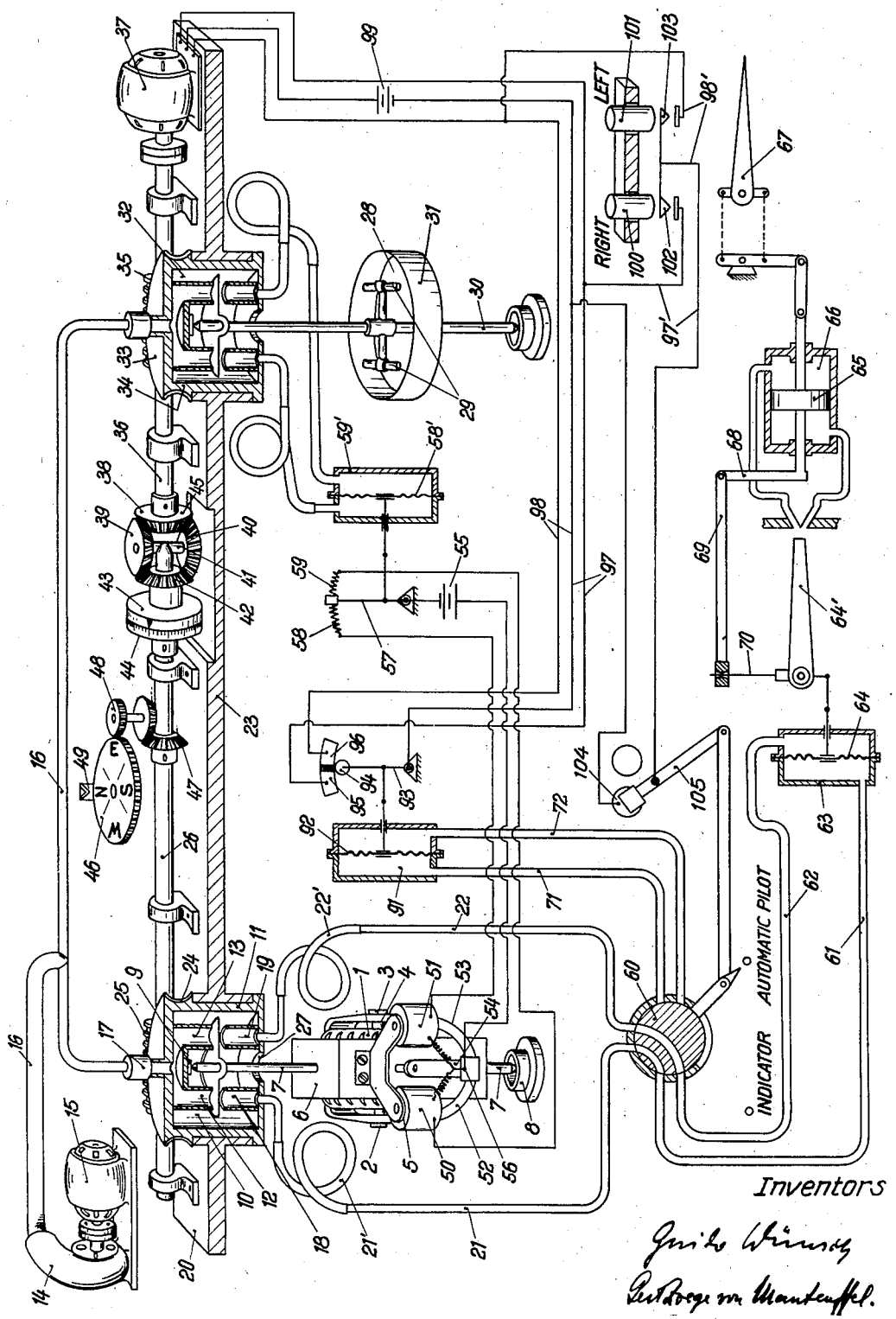
Inventors Patented Aug. 16, 1938

2,126,855

UNITED STATES PATENT OFFICE 2,126,855

DIRECTION MAINTAINING MEANS FOR USE ON DIRIGIBLE CRAFT

Guido Wünsch, Berlin-Steglitz, and Gert Zoege von Manteuffel, Berlin-Dahlem, Germany, assignors to Askania-Werke A. G., vormals Centralwerkstatt Dessau und Carl Bamberg-Friedenau, a corporation of Germany Application July 29, 1936, Serial No. 93,307
In Germany June 26, 1935

19 Claims. (Cl. 244—76)

Our invention relates to direction maintaining means for use on dirigible craft, more particularly to directional instruments for aircraft serving as navigational instruments or as base line for automatic steering, or both.

We are aware that it has been proposed to correct the position of a directional gyroscope by means of a compass. The gyroscope in this combination, which is known as "gyro magnetic compass", gives a steady indication of the average position of the compass while the latter checks the wander of the former. Where such gyro magnetic compasses were used as base line for automatic steering the gyroscope had to be moved into a new position, as far as we are aware, when a change of course was desired. Manually operated means have been proposed to increase the rate of changing the gyroscope position.

One object of our invention is therefore the provision of a novel combination of a gyroscope and a directional instrument for use as baseline in automatic steering which eliminates the necessity of changing the position of the gyroscope when a change of course is to be effected.

A further object of our invention is to provide novel master direction indicating means capable of operating repeater indicators from a distance.

A still further object is the provision of novel means to compensate for the magnetic compensation error or for the compass declination of gyro magnetic compasses to obtain correct readings of the indicator members.

These and other objects and advantages of the invention will appear more fully hereinafter from a consideration of the detailed description which follows together with the accompanying drawing wherein an embodiment of our invention is illustrated. It is to be expressly understood, however, that the drawing is for the purpose of illustration only and not designed as a definition for reference this purpose being had to the accompanying claims.

Fig. 1 is a diagram showing how we propose to combine a directional gyroscope with a magnetic compass for use as direction indicating means and as base line for automatic steering.

As a basic direction maintaining unit we propose to employ a gyroscope having three degrees of freedom. The rotor 1 may be driven by any suitable means, such as air jets or electricity (not shown). The rotor spin axis is carried in horizontal bearings 2, 3 by a rotor bearing member 4. The rotor bearing member 4 is mounted for oscillation about a second horizontal axis 5 in a vertical frame 6. The latter is mounted for turning about a vertical axis 7 the bearings of which are shown at 8 and 9.

The gyroscope is shown as provided with a controller 10 which is shown and described in the prior patent to Wünsch 1,729,850 dated October 1, 1929 in connection with a magnetic compass. However, we desire to have it understood that other types of controllers may be employed with equal benefit, for example controllers of the electrical type which are well known in the art.

The controller comprises a secondary element in form of a casing 11 carrying two ports 12, 13. Said ports are supplied with compressed air generated in any suitable manner such as a cyclone-type impeller 14 for instance driven by a motor 15. The compressed air is carried to the controller through a pipe line 16 which is connected to the controller by means of a pipe coupling 17, the latter permitting a rotary movement of the casing 11.

Opposite to the first pair of ports 12, 13 a second pair 18, 19 is positioned adapted to receive all or a part of the air emitted from the ports 12, 13 depending on the relative position of the intercepting disk 20 which is carried by the vertical axis 7, with regard to the said ports. The disk 20 constitutes the primary element of said controller. The air received by the second pair of ports sets up a differential pressure in the pipes 21, 22 which are shown as comprising flexible connections 21', 22'.

The casing 11 of the controller 10 is rotatably mounted in a support 23 secured to the craft. The casing carries a worm gear 24 and may be rotated by means of a worm 25 secured to the shaft 26. The used air may escape from the casing 11 through an opening 27.

It appears from the foregoing that the controller 10 will set up a pressure differential upon relative turning of the craft and the gyroscope in azimuth and that the neutral position of said controller may be adjusted by rotating the casing 11 of the same.

For correcting the position of the gyroscope we propose a magnet compass, a simplified construction of which is shown in the drawing at 28. The type of compass described in my above mentioned Patent 1,729,850 may preferably be used for this purpose.

We desire to have it understood that the position of the gyroscope may also be corrected from a wireless directional system in place of a compass such as described in the Patent 1,896,805 to Elmer A. Sperry dated February 6, 1933.

The compass 28 comprises a magnet system 29 rotatable about a vertical axis 30 and may be additionally provided with a compass card 31. The magnet system operates a controller 32 similar to the one described in connection with the gyroscope. The casing 33 of the controller 32 is also rotatable with regard to the support 23 by means of a gear 34 and worm 35 secured to the shaft 36 driven by the reversible motor 37.

The shafts 26 and 36 are connected over a differential gear train 38. The one arm of said gear train is connected with the shaft 26 and comprises gears 39, 40 on the cross arm 41 of said shaft. The second arm comprises the gear 42 rigidly connected with the indicator disk 43 which is freely rotatable on shaft 26. The indicator disk 43 cooperates with a second disk 44 carrying a graduation. The second disk is held fixed. The third arm comprises the gear 45 secured to shaft 36.

The position of the casing 11 in azimuth may be read on an indicator disk 46 operated from the shaft 26 over a gear train 47, 48. The indicator disk is provided with a reference mark 49 fixed relatively to the craft.

The gyroscope is equipped with a pair of torque applying solenoids 50, 51 fixed to the vertical frame 6. Cooperating therewith, there is fixed to the horizontal axis 5 of the rotor bearing member 4 a pair of oppositely disposed iron cores 52, 53 secured to the arm 54. Said cores partially enter the solenoid windings so that when a greater E. M. F. is impressed upon one solenoid than on the other a torque will be applied about the horizontal axis 5 to precess the gyroscope.

The electrical circuits for operating the torque applying device comprises a battery 55 connected to a common terminal 56 of the solenoids and a movable arm 57 of the variable resistance 58, 59. In the neutral position of the arm 57 an E. M. F. of equal strength will be impressed on solenoids 50, 51 and consequently no torque be applied to the gyroscope. The position of the arm 57 is controlled by a diaphragm 58' enclosed in a casing 59' upon which diaphragm the differential pressure set up by the controller 32 is impressed.

There is further provided a change-over valve 60 from which one pair of pipes 61, 62 extends to a diaphragm casing 63 with a diaphragm 64 controlling the position of a jet pipe 64' of a steering device of the type shown and described in the Patent 1,967,156 to Moller, dated July 17, 1934. The jet pipe is supplied with pressure fluid from a source (not shown) and controls the position of the piston 65 of a servomotor 66 for operating the rudder 67. A follow-back connection is also provided which is shown in the example to include the rigid arm 68, the link 69, and a flat spring 70 tending to move the jet pipe into the normal position shown in the drawing.

A second pair of pipes 71, 72, to which the controller 10 may be connected upon clockwise turning of the valve cock by about 90 degrees, leads to a diaphragm casing 91 the diaphragm 92 of which operates a switch. The said switch comprises a contact arm 93 and roller 94 which normally rests on a narrow strip of insulating material separating the segments 95 and 96 of conducting material. Upon movement of the roller onto one segment or the other the circuits 97 and 98, respectively, will be closed, thereby connecting the battery 99 to the windings of the reversible motor 37.

A second contact making device to control the reversible motor is provided comprising push buttons 100 and 101 for operating the make contacts 102 and 103 to close the circuits 97' and 98'. The push button contacts lie in parallel with the first mentioned contact-making device 93 to 96. A further break contact 104, 105 is provided for breaking the connection between battery 99 and push button contacts when the change-over valve is in the indicator position.

The operation of this form of our invention is briefly as follows.

Assuming the change over valve 60 is in the "automatic pilot" position, it appears that the rudder will be controlled from the gyroscope operated controller 10 and maintain the course set thereon. If the gyroscope should begin to wander, the change of course caused thereby will immediately be detected by the compass and the controller 32 will set up a differential pressure in the diaphragm casing 59', change the ratio of the resistance 58 and 59 and exert a torque about the horizontal axis 5 of the gyroscope.

The novel feature which consists in the device for changing the neutral position of both of the controllers 10 and 32 permits an instantaneous changing of course without moving the vertical frame of the gyroscope into a new position.

In the form of our invention shown in the drawing the course may easily be changed by pressing down push button 100 or 101, respectively, whereby the motor 37 is caused to turn shafts 26 and 36 in one or the other direction until the new course is set which may be read on the indicator disk 46. The craft will then instantaneously turn into the new direction.

The novel feature of changing the phase relation of the controllers permits the introduction of various corrections and compensations.

By introducing a compensation for the declination, that is the difference between the direction of the horizontal component of the earth's magnetic field and the true north direction, the indicator disk can be made to read, and the gyroscope to steer, true geographical directions.

If the magnet system cannot be compensated for to indicate the true magnetic or geographical direction for all course directions, the indicator disk can be made to read, and the gyroscope to steer, true magnetic or geographical direction, by introducing a compensation for magnetic compensation error of the compass.

Assuming the device is to be used as an indicator to show the direction of course of the craft while the same may be manually piloted, the change over valve 60 is set in the "indicator" position, whereby the push button contacts are automatically separated from the battery 99.

Each movement of the craft and thereby of the secondary elements of the controllers 10 and 32 will cause a differential pressure to be set up by the controller 10 whereby the reversible motor 37 is caused to turn the secondary elements of the controllers until the neutral position is restored. In other words, the secondary elements 10 and 32 are caused to follow the primary elements controlled by gyro and magnet system. It appears that the indicator disk 46 will always indicate the true direction and may thus be used in place of a compass. Repeater indicators may also be operated from disk 46 or shaft 26 by means of repeater systems well known in the art.

An accidental pushing down of buttons 100 and 101 will have no disturbing effect as the battery 99 is cut off.

We are aware that our present invention may be embodied in other specific forms than those herein described. For instance the electrical torque applying device may be replaced by a pneumatic one. The changing over from an automatic steering device to the indicator may be effected by other means, for instance by keeping the diaphragm casings 63 and 91 permanently connected to pipes 21 and 22 while shutting off the supply of pressure fluid to the jet pipe 64' and by disconnecting the battery 99 from push buttons 100 and 101 in case the device is to be used as indicator. Such changes may be made without departing from the spirit or essential attributes of our invention.

We therefore desire the present embodiment of this invention to be considered in all respects as illustrative and not restrictive, reference being had to the appended claims rather than to the foregoing description to indicate the scope of the invention.

What we claim is:

1. A directional maintaining means for craft comprising a free gyroscope; a first controller governed by the relative position of the craft and said gyroscope; an instrument responsive to the direction of lines of force; a second controller governed by the relative position of the craft and said instrument; means operable by the second controller for correcting said gyroscope; and means operable by said first controller for equiangularly turning said controllers with respect to the craft.

2. A direction maintaining means for craft comprising a free directional gyroscope; a first controller governed by the relative position of the craft and said gyroscope; a magnetic compass; a second controller governed by the relative position of the craft and said compass; means operable by the second controller for correcting said gyroscope; and means operable by said first controller for equiangularly turning said controllers with respect to the craft.

3. A direction maintaining means for craft comprising a free directional gyroscope; a first controller governed by the relative position of the craft and said gyroscope, said controller comprising a primary gyroscope-actuated element and a secondary craft-connected element; a magnetic compass; a second controller governed by the relative position of the craft and said compass, said second controller comprising a primary compass-actuated element; and a secondary craft-connected element; means operable by the second controller for correcting said gyroscope; and means operable by said first controller for equiangularly turning the secondary elements of said controllers in azimuth with respect to the craft.

4. A direction maintaining means for craft comprising a free directional gyroscope; a first controller governed by the relative position of the craft and said gyroscope, said controller comprising a primary gyroscope-actuated element and a secondary craft-connected element; a magnetic compass; a second controller governed by the relative position of the craft and said compass, said controller comprising a primary compass-actuated element and a secondary craft-connected element; means operable by the second controller for correcting said gyroscope; means operable by said first controller for equiangularly turning the secondary elements of said controllers in azimuth with respect to the craft; and indicating means for indicating the relative position of the primary elements of said controllers with respect to the craft.

5. A direction maintaining means for craft comprising a free directional gyroscope; a first controller governed by the relative position of the craft and said gyroscope, said controller comprising a primary gyroscope-actuated element and a secondary craft-connected element; a magnetic compass; a second controller governed by the relative position of the craft and said compass, said second controller comprising a primary compass-actuated element and a secondary craft-connected element; means for exerting a corrective torque on said gyroscope, said torque exerting means being controlled by said second controller; a worm and gear drive for equiangularly rotating both of said secondary elements in azimuth; a common driving shaft to which the said worms are secured; and power means to rotate said shaft, said power means being controlled by the relative turning of the primary and secondary element of said first controller.

6. A direction maintaining means for craft comprising a free directional gyroscope; a first controller governed by the relative position of the craft and said gyroscope, said controller comprising a primary gyroscope-actuated element and a secondary craft-connected element; a magnetic compass; a second controller governed by the relative position of the craft and said compass, said second controller comprising a primary compass-actuated element and a secondary craft-connected element, means for exerting a corrective torque on said gyroscope, said torque exerting means being controlled by said second controller; a worm and gear drive for equiangularly rotating both of said secondary elements in azimuth; a common driving shaft to which the said worms are secured; power means to rotate said shaft, said power means being controlled by the relative turning of the primary and secondary element of said first controller; and indicating means for indicating the relative position of the primary elements of said controllers with respect to the craft.

7. A direction maintaining means for craft as claimed in claim 5, in which a differential gear train is also provided in the shaft between the said worms, one arm of said differential gear train being connected with the one worm and power means, the third arm being connected to the second worm, and the second arm being connected with rotatable correcting means for changing the phase relation of the said controller.

8. A direction maintaining means for craft as claimed in claim 6, in which a differential gear train is also provided in the shaft between the said worms, one arm of said differential gear train being connected with the one worm and power means, the third arm being connected to the second worm, and the second arm being connected with rotatable correcting means for changing the phase relation of the said controllers.

9. A baseline for operating automatic steering for craft comprising a directional gyroscope; a first controller governed by the relative position of the craft and said gyroscope, said controller comprising a primary gyroscope-actuated element and a secondary craft-connected element; a magnetic compass; a second controller governed by the relative position of the craft and said compass, said second controller comprising a primary compass-actuated element and a secondary craft-connected element; means for exerting a corrective torque on said gyroscope, said torque exerting means being controlled by said second controller; a worm and gear drive for synchronously rotating both of said secondary elements in azimuth; a common driving shaft to which the said worms are secured; a reversible motor including a source of power for rotating said shaft for changing course; and a push-button control for reversely controlling said motor.

10. A baseline for operating automatic steering for craft comprising a directional gyroscope; a first controller governed by the relative position of the craft and said gyroscope, said controller comprising a primary gyroscope-actuated element and a secondary craft-connected element; a magnetic compass; a second controller governed by the relative position of the craft and said compass, said second controller comprising a primary compass-actuated element and a secondary craft-connected element; means for exerting a corrective torque on said gyroscope, said torque exerting means being controlled by said second controller, a worm and gear drive for synchronously rotating both of said secondary elements in azimuth; a common driving shaft to which the said worms are secured; means to rotate said shaft for changing the course; and indicating means for indicating the relative position of the secondary elements of said controllers with respect to the craft.

11. A baseline for operating automatic steering for craft comprising a directional gyroscope; a first controller governed by the relative position of the craft and said gyroscope, said controller comprising a primary gyroscope-actuated element and a secondary craft-connected element; a magnetic compass; a second controller governed by the relative position of the craft and said compass, said second controller comprising a primary compass-actuated element and a secondary craft-connected element; means for exerting a corrective torque on said gyrocope, said torque exerting means being controlled by said second controller; a worm and gear drive for synchronously rotating both of said secondary elements in azimuth; a common driving shaft to which the said worms are secured; a reversible motor including a source of power for rotating said shaft for changing course; a push-button control for reversely controlling said motor; and indicating means for indicating the relative position of the secondary elements of said controllers with respect to the craft.

12. A baseline for operating automatic steering for craft comprising a directional gyroscope; a controller governed by the relative position of the craft and said gyroscope, said controller comprising a primary gyroscope-actuated element and a secondary craft-connected element; a magnetic compass; a second controller governed by the relative position of the craft and said compass, said second controller comprising a primary compass-actuated element and a secondary craft-connected element; means for exerting a corrective torque on said gyroscope, said torque exerting means being controlled by said second controller; a worm and gear drive for synchronously rotating both of said secondary elements in azimuth; a common driving shaft to which the said worms are secured; means to rotate said shaft for changing the course and a differential gear train in the shaft between the said worms, one arm of said differential gear train being connected with the one worm and said rotating means, the third arm being connected to the second worm, and the second arm being connected with correcting means for changing the phase relation of the said controllers.

13. A baseline for operating automatic steering for craft as claimed in claim 9 in which a differential gear train is also provided in the shaft between the said worms, one arm of said differential gear train being connected with the one worm and said rotating means, the third arm being connected to the second worm, and the second arm being connected with correcting means for changing the phase relation of the said controllers.

14. In a craft the combination comprising a free gyroscope; a first controller governed by the relative position of the craft and said gyroscope; means adapted to be operated by said controller for effecting automatic steering; an instrument responsive to the direction of lines of force; a second controller governed by the relative position of the craft and said instrument; means operable by the second controller for correcting said gyroscope; means for synchronously turning said controllers with respect to the craft; means for indicating the relative position of said controllers with respect to the craft to give direction; manually operable turning means; and means for operatively connecting at will said synchronous turning means with said first controller and for simultaneously rendering said automatic steering means inoperative,—to give direction indications and for operatively connecting said synchronous turning means to said manually operated turning means and for simultaneously rendering said automatic steering means operative to cause the same to operate as an automatic steering device, whereby change of course may be effected.

15. In a craft the combination comprising a free gyroscope; a first controller governed by the relative position of the craft and said gyroscope; means adapted to be operated by said controller for effecting automatic steering; a magnetic compass; a second controller governed by the relative position of the craft and said compass; means operable by the second controller for correcting said gyroscope; means for synchronously turning said controllers with respect to the craft; means for indicating the relative position of said controllers with respect to the craft to give direction; manually operable turning means; and means for operatively connecting at will said synchronous turning means with said first controller and for simultaneously rendering said automatic steering means inoperative—to give direction indications and for operatively connecting said synchronous turning means to said manually operated turning means and for simultaneously rendering said automatic steering means operative to cause the same to operate as an automatic steering device, whereby change of course may be effected.

16. In a craft the combination outlined in claim 15 in which additional means are provided for changing the phase relation of the said synchronously moved controllers.

17. In a craft the combination of a directional gyroscope; means for exerting a corrective torque thereon; a controller governed by the relative position of the gyroscope and the craft; a magnetic compass; a second controller governed by the relative position of the compass and the craft for exciting said means to correct the gyroscope; means for synchronously rotating both of said controllers with respect to the craft; and means for changing the phase relation of the said controllers to compensate for magnetic compass declination.

18. A direction maintaining means for craft comprising a free gyroscope; a first controller governed by the relative position of the craft and said gyroscope; a directional instrument; a second controller governed by the relative position of the craft and said instrument; means operable by said second controller for correcting the gyroscope; and means operable by said first controller for equiangularly changing the relative position between both controllers and the craft.

19. A direction maintaining means for craft comprising a free gyroscope; a first controller governed by the relative position of the craft and said gyroscope; a directional instrument; a second controller governed by the relative position of the craft and said instrument; means operable by the second controller for correcting the gyroscope; means operable by said first controller for equiangularly changing the relative position between both controllers and the craft; and means for changing the phase relation of both controllers.

GUIDO WÜNSCH.
GERT ZOEGE von MANTEUFFEL.